May 27, 1941. G. KARST 2,243,344

FLOW DIVERSION VALVE SYSTEM

Filed April 22, 1939

INVENTOR.
GEORGE KARST
BY
ATTORNEY.

Patented May 27, 1941

2,243,344

UNITED STATES PATENT OFFICE 2,243,344

FLOW DIVERSION VALVE SYSTEM

George Karst, Rochester, N. Y., assignor to Taylor Instrument Companies, Rochester, N. Y., a corporation of New York Application April 22, 1939, Serial No. 269,437

2 Claims. (Cl. 277—42)

This invention relates to flow diversion valves.

In the treating of various liquids, particularly in the pasteurization of milk in a continuous flow system, a flow diversion valve has been used to permit only the flow of properly pasteurized milk from the pasteurizing unit to the bottling machine, while diverting improperly pasteurized milk for recirculation through the pasteurizer. Since the improper operation of such a flow diversion valve might allow contaminated milk to reach the consumer, it is important that the valve be absolutely reliable in operation. Furthermore, the valve should include means for promptly indicating any failure in its operation.

In accordance with the main feature of the invention there is provided a flow-diversion valve of such construction that it assures a high-degree of reliability in operation and also indicates any leakage at the outlet port of the valve when the milk or other liquid is being diverted to the by-pass port.

Figure 1:
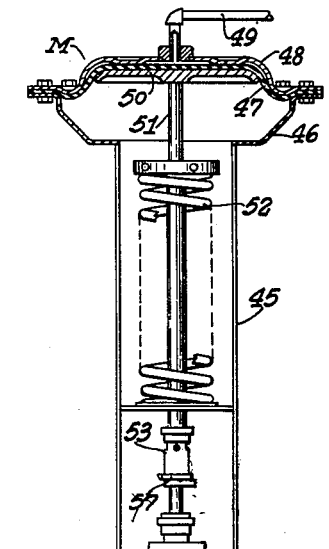
Figure 3:
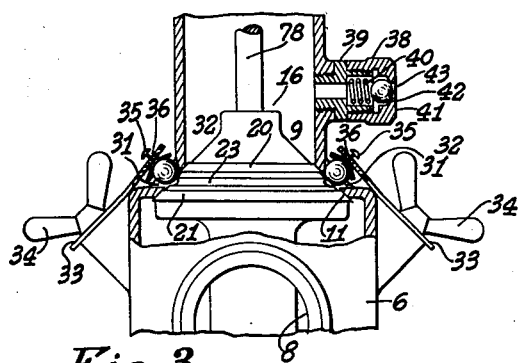
Figure 2:
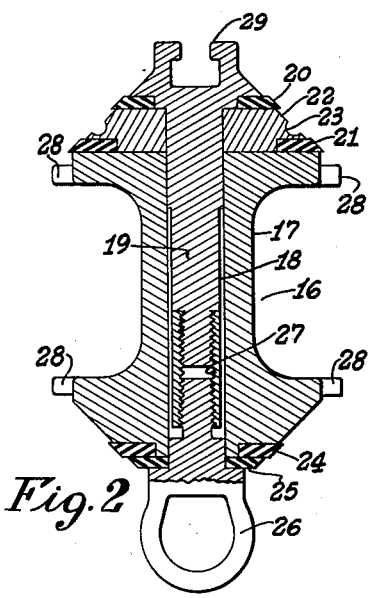

These and other features of the invention will appear from the detailed description and claims when taken with the drawing in which Fig. 1 represents a vertical section of a flow diversion valve and its motor, constructed in accordance with the present invention; Fig. 2 is an enlarged vertical section of the movable valve element; Fig. 3 is an enlarged fragmentary view looking from the right of Fig. 1, with a portion of the valve body being broken away to illustrate more clearly details of the invention.

The flow diversion valve generally designated 5, comprises a body 6 having a valve chamber 7 communicating with an inlet port 8, an outlet port 9 and a by-pass outlet port 10. The upper end of the valve chamber, as illustrated, is tapered to provide, adjacent the outlet port 9, a conical valve seat 11 while the lower open end 12 of the valve body is provided with a separable lower body connection 13 detachably secured thereto by means of the lower connecting nut 14. This body connection is flared at its upper end to provide, adjacent the by-pass port, a conical valve seat 15 opposite the valve seat 11.

A valve disc member 16 shown in section in Fig. 2 is movable in the chamber to close the outlet port 9 and to open the by-pass port 10, as shown in Fig. 1 and conversely, is also movable in the chamber to close the by-pass port and to open the outlet port. This member comprises an elongated disc-supporting body 17 having a central bore 18 therethrough which receives the disc-connecting stud 19. This disc-connecting stud serves to clamp the small and large annular rubber rings 20 and 21, respectively, with the leak detector ring 22 therebetween, to the upper end of the disc body. The tapered edges of the disc rings 20 and 21 cooperate with the valve seat 11 to provide a double-seal separated by the leak detecting ring with its leak-detecting groove 23 therein. A small annular, rubber disc 24 for cooperation with the valve seat 15, is clamped to the lower end of the disc body by the washer 25 and the eye bolt 26 which is adjustably secured to the connecting stud 19 by means of the internally threaded stud connector sleeve 27. Laterally projecting lugs 28 on the disc body guide the valve member in the chamber during reciprocating movements.

The valve member is adapted to be shifted to engage either of the valve seats 11 or 15 by means of a valve stem 78 detachably secured in the upper slotted end 29 of the connecting stud 19. This valve stem which extends through stuffing box 30 is actuated by a suitable motor such as a diaphragm motor, to be described.

Since it is important that under-pasteurized milk should not pass through the outlet port, means are provided for detecting any leakage past either of the disc rings 20 and 21. As shown in detail in Fig. 3, the upper tapered wall of the valve chamber is provided with diametrically opposed apertures 31 which are closed by means of the ball valves 32 when the valve disc body is in its lower position. These valve balls are mounted on the leaf springs 33 secured to the valve body by means of the butterfly nuts 34, the ball valves being held on the free end of the leaf springs by means of the headed pins 35 loosely received in the holes 36 provided in the free ends of these springs. The leak detector ring 22 has its circumferential leak-detecting groove 23 alined with the mentioned apertures 31 in the body 6 when the valve disc body is in its upper position. In this position the leak detector ring moves the ball valves out of their valve seats so that any liquid that might leak past the rubber disc rings 20 or 21 will be discharged through the apertures.

Inasmuch as a vacuum would be created in the outlet 37, if the milk is drained therefrom when the outlet port 9 is closed, a relief valve generally indicated 38 has been provided. This relief valve shown in section in Fig. 3, comprises the threaded nipple 39 having an enlarged recess for receiving the compression spring 40. An apertured cap 41 having a valve seat 42, contains a ball valve 43 which is normally held against this valve seat by the spring 44, when the cap is screwed on to said nipple.

The previously mentioned motor M is mounted on the top of the flow diversion valve body as illustrated in Fig. 1 and includes a frame 45 terminating at its upper end in an enlarged cup 46. A flexible diaphragm 47 together with a metal top 48 the margins of which are clamped to the edge of the cup 46, define an air chamber into which compressed air or like is supplied through the conduit 49 under the control of a temperature regulator to be referred to. The underside of the diaphragm bears against a circular plate 50 carried by the upper end of the valve stem extension 51 which is normally held in its upper position (Fig. 1) by the spiral spring 52. This valve stem extension is detachably connected to the valve stem 78 by means of a coupling generally designated 53.

The operation and function of the present flow diversion valve will best be understood by considering a specific application of the same. If, for example, it is desired to pasteurize milk in a continuous flow system, the present valve will be included in the system so that milk which has not been brought to the desired temperature before entering the valve at the inlet 8, will be diverted from the normal outlet 37 through the by-pass outlet 10 to the pasteurizing unit, for further pasteurization. A control mechanism (not illustrated) similar to that shown in the Foote Patent No. 2,088,055 granted July 27, 1937, may be utilized for operating the valve in such a manner that when the milk leaving the pasteurizer drops below a predetermined temperature, the valve will be shifted to the position shown in Fig. 1 to close the port 9 and divert the milk to the by-pass outlet 10. With the valve in this position the leak detector ring 22 moves the ball valves 32 out of their valve seats so that any liquid that might leak past the disc rings 20 or 21 will be discharged through the aperture 21. When, however, the milk leaving the pasteurizer reaches the proper temperature, the valve will be shifted to its lower position, opening port 9 and closing the by-pass port 10.

While reference has been made to a specific application of the present valve, it is to be understood that this has been done only for the sake of clearness since many other applications and uses for the valve and apparatus for controlling the same will be apparent.

I claim:

1. In a device of the character described, a valve body including a valve chamber provided with an inlet opening and an outlet opening, a conical valve seat formed in said body at one of said openings, said seat having an aperture therein communicating with the exterior of said body and located intermediate the edges of said seat, means for normally closing said aperture, a valve member movable into engagement with and out of engagement with said seat, said valve member having spaced conical surface portions complementary to said conical seat and engageable with said seat at opposite sides of said aperture to provide a double seal, the portion of the surface of said valve member between said conical surface portions being recessed to provide an annular space communicating with said aperture when said valve member is in engagement with said seat, said means being movable by said recessed portion of said valve member to open said aperture on engagement of said valve member with said seat.

2. In a device of the character described, a valve body including a valve chamber provided with an inlet opening and an outlet opening, a conical valve seat formed in said body at one of said openings, said seat having an aperture therein communicating with the exterior of said body and located intermediate the edges of said seat, means for normally closing said aperture, a valve member movable into engagement with and out of engagement with said valve seat, said valve member having spaced resilient members secured thereto, said resilient members having alined conical surfaces engageable with said seat at opposite sides of said aperture to provide a double seal, the portion of said valve member between said resilient members being recessed to provide an annular space communicating with said aperture when said valve member is in engagement with said seat, said first-mentioned means being movable by said valve member to open said aperture.

GEORGE KARST.